Feb. 27, 1962 S. KOWALSKI ETAL 3,022,978
HIGH PRESSURE VALVE SEAT
Filed Dec. 3, 1957
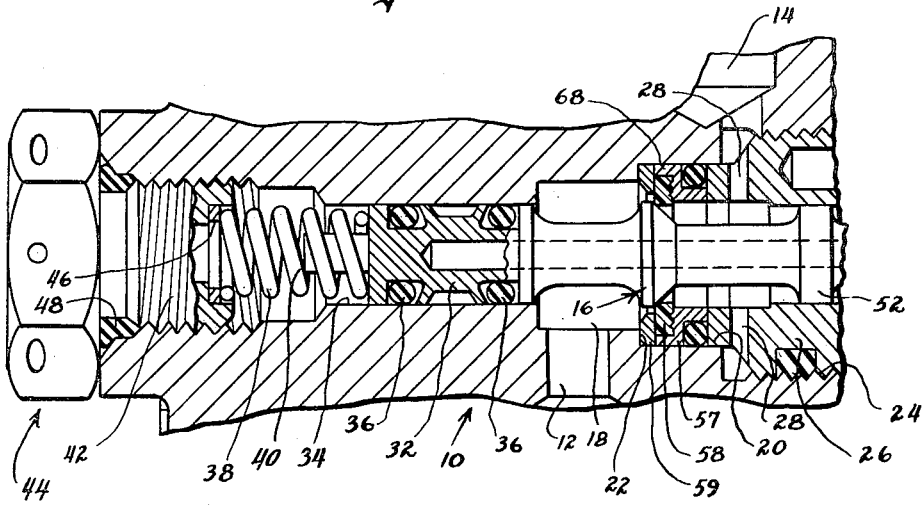
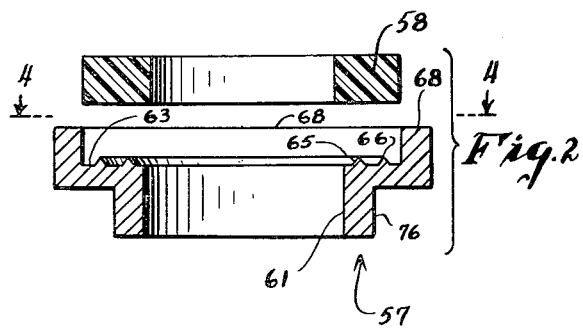
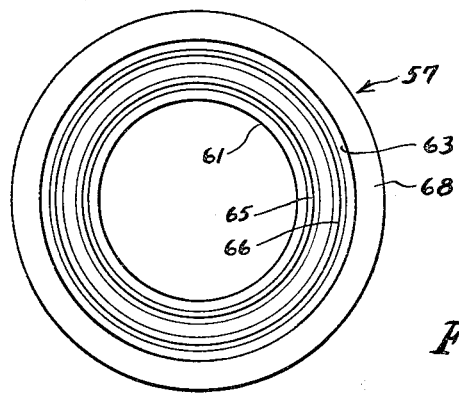
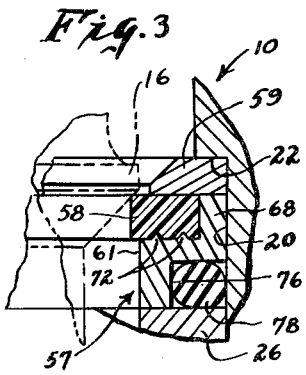
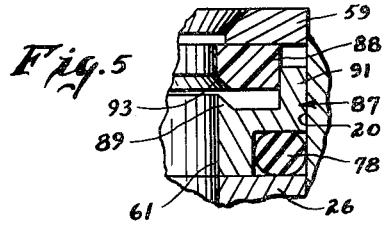
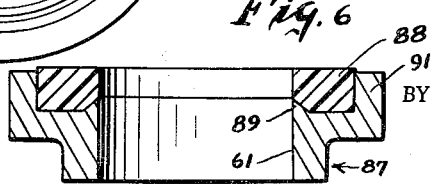
INVENTORS
Slawomir Kowalski
John D. Kenann
Emery Whittemore
Sandoe & Dix
ATTORNEYS United States Patent Office 3,022,978
Patented Feb. 27, 1962

3,022,978
HIGH PRESSURE VALVE SEAT
Slawomir Kowalski, Rockaway, and John G. Kenann, Millburn, N.J., assignors to Marotta Valve Corporation, Boonton, N.J., a corporation of New Jersey
Filed Dec. 3, 1957, Ser. No. 700,461
3 Claims. (Cl. 251—362)

This invention relates to valve seats and more especially to valve seats with which low forces can be used for sealing gas which is at very high pressure.

It is an object of the invention to provide a valve seat construction in which a poppet valve seats against a plastic seat element, but in which the plastic seat element is confined between other parts and constructed in such a way as to prevent gradual flow and distortion of the plastic over a period of time. Although the invention can be made with various plastics for the valve seat element, nylon and Kel-F have proved to be particularly desirable plastics for the purpose; and valves made in accordance with this invention give satisfactory service at pressures up to 10,000 pounds per square inch.

One of the outstanding advantages of using a plastic seat for sealing high pressure is that the pressure of a poppet valve against the seat does not need to be as great, in order to seal the high pressure, when the poppet valve seats against plastic as compared with a metal seat. By reducing the pressure required for sealing against flow with the valve closed, smaller and lighter operating mechanism can be used, and pressures can be effectively sealed where only low forces are available for operating the valve.

Another object of the invention is to provide a valve assembly in which a valve casing is provided with a chamber having a counter bore at one end, and having a bushing with a portion that fits into the counter bore, and a valve seat assembly with the parts clamped in assembled relation by the bushing and against the end wall of the counter bore. This provides a construction in which the parts are accurately held in place and the various parts can be of simple design without fastening means or other mechanical construction which would complicate the manufacture of the parts with close tolerances for the dimensions which effect the functioning of the valve.

Other objects, features and advantages of the invention will appear or be pointed out as the description proceeds.

In the drawing, forming a part hereof, in which like reference characters indicate corresponding parts in all the views;

FIGURE 1 is a fragmentary sectional view of a valve which includes a valve seat construction made in accordance with this invention;

FIGURE 2 is a view showing some of the parts of the valve assembly before they are brought into assembled relation with one another;

FIGURE 3 is a greatly enlarged, fragmentary, view of a portion of the structure shown in FIGURE 1;

FIGURE 4 is a view of the shell shown in FIGURE 2, the view being taken on the line 4—4 of FIGURE 2;

FIGURE 5 is a fragmentary, sectional view of a modified form of the invention with the parts in position prior to assembly; and FIGURE 6 is a sectional view through the valve element of FIGURE 5 after assembly of the parts.

The valve assembly shown in FIGURE 1 includes a valve casing indicated by the reference character 10. The valve casing has a port 12 on one side and another port 14 on the other side. A poppet valve element 16 moves between open and closed positions to establish and shut off communication between the ports 12 and 14. The valve element 16 is located in a valve chamber 18 enclosed within the housing 10. This valve chamber 18 has a counter bore 20 with an annular end wall 22.

There is a second and larger counter bore 24 into which a bushing 26 threads, and this bushing 26 has an end portion which fits into the counter bore 22. There are radially extending openings 28 through the bushing 26 for flow of gas from the interior of the bushing to the port 14.

The valve element 16 has a piston portion 32 which slides in a bore 34 at the left-hand end of the valve chamber. The purpose of this piston portion is to counterbalance the valve element for pressure in the port 12. The piston portion 32 has sealing rings 36. There is a spring 38 which fits over a stud 40 at the end of the valve element; and this spring 38 maintains pressure on the valve element 16 in order to give it a bias toward closed position.

The spring 38 fits into a counter bore in a threaded end portion 42 of a screw 44 which fits into the end of the valve casing 10 in alignment with the valve element 16. There is a washer 46 between the end of the spring 38 and the shoulder on the screw 44 with which the spring 38 contacts. There is packing 48 compressed between the head of the screw 44 and the edges of the opening into which the screw fits. This construction is merely representative of means for maintaining a pressure against the valve element 16.

At the other end of the valve element 16 there is another piston portion 52 which slides in a bore in the bushing 26 and the purpose of which is to counter balance the valve element 16 for pressure in the passage or port 14.

The valve 16 closes against a valve seat construction which includes a shell 57, preferably made of metal, a plastic seat element 58 and a ring 59. This ring 59 is also preferably made of metal.

FIGURE 2 shows the shell 57 and the plastic seat element 58 before they are assembled. The metal shell 57 has a longitudinal opening 61 extending through it, and has a shoulder 63 extending outwardly from the edges of the opening 61. This shoulder 63 provides an annular face around the opening 61 and there are two circular ridges 65 and 66 extending from the annular surface of the shoulder 63.

These circular ridges 65 and 66 are preferably continuous around their entire circumferences and they are preferably formed of the same material as the shell 57, and of one piece construction therewith. The ridges 65 and 66 have a cross section which tapers to a relatively sharp edge at the end of each ridge which is away from the surface of the shoulder 63. Except for the ridges 65 and 66, the annular surface of the shoulder 53 is substantially at right angles to the longitudinal axis of the opening 61 through the shell 57.

The shell 57 has a wall 68 extending around the periphery of the shoulder 63 and preferably of one piece construction with the rest of the shell 57. This wall 68 is cylindrical and has its axis in alignment with the axis of the longitudinal opening. The plastic seat element 58 fits within the wall 68, the outside diameter of the plastic seat element 58 being equal to the inside diameter of the wall 68 and is prevented from flowing axially, in an outward direction, by the wall 68. In order to have an accurate assembly for concentricity, the plastic seat element 58 is made so as to fit with a press fit into the space surrounded by the wall 68.

In the preferred construction, the plastic seat element 58 has no groove for receiving the ridges 65 and 66 when the parts are first assembled. When the plastic seat element 58 is initially placed in the recess provided by the wall 68 and the shoulder 63, the plastic seat element 58 is forced against the shoulder 63 with sufficient pressure to cause the ridges 65 and 66 to force their way into the confronting face of the plastic seat element 58 and to form grooves 72 (FIGURE 3) complementary to the ridges 65 and 66 (FIGURE 2).

The plastic seat element 58 is originally supplied with a height slightly greater than the height of the wall 68 so that during assembly the ram of a press can contact with the top surface of the seat element 58 without striking the end face of the wall 68. After assembly, the plastic seat element 58 is bored to obtain concentricity with the counterbore 20. The seat element 58 is faced to bring its surface within a few thousandths of the top of the wall 68. When the parts are assembled, the clamping pressure forces the face of the plastic seat element 58 down flush with the top surface of the wall 68.

FIG. 3 shows the assembly which is also shown in FIG. 1, but FIG. 3 is on a greatly enlarged scale and the valve 16 is shown only in phantom in FIG. 3 in order to illustrate more adequately the parts of the seat assembly. The outside cylindrical surface of the shell 57 fits accurately within the counter bore; but to prevent leakage of high pressure fluid there is a recess 76 in the shell 57, and preferably at one end of the shell, for holding resilient sealing means, such as an O-ring 78. The end face of the bushing 26 contacts with the end face of the shell 57 after compressing the O-ring 78 slightly so as to bring the O-ring into sealing contact with the wall of the counter bore 20 and the confronting face of the shell.

The ring 59 contacts directly with the end wall 22 of the counter bore and is held against this end wall by pressure of the top face of the wall 68 and the top face of the plastic seat element 58. From the construction illustrated it will be apparent that the end face of the bushing 26 clamps the O-ring 78, shell 58, plastic seat element 58 and ring 59 together, and with the assembly against the annular surface of the end wall 22 of the counter bore.

The plastic seat element 58 is preferably assembled with the shell 57 before being inserted into the counter bore 21; and the other parts can be pre-assembled if desired, but it is not necessary that any of them be pre-assembled.

In the construction illustrated, the plastic seat element 58 has an inside diameter slightly less than the diameter of the passage through the shell 57. This is desirable for giving the construction more of the physical characteristics of the plastic of which the seat element 58 is made. The ring 59 has an inside diameter substantially less than that of the seat element 58 so as to leave clearance for the peripheral part of the valve element 16 and so as to leave some exposed area of the plastic element 58 for contact with the face of the valve element 16.

In order to prevent flow, over a period of time, of the plastic material of which the seat element 58 is made, the seat element is constructed of a size which completely fills the space enclosed by the shoulder 63, wall 68 and ring 59, as previously explained. The ridges 72 also serve to prevent flow of the plastic, particularly inward flow resulting from downward pressure which reacts against the wall 68 to produce some components of radial inward stress in the plastic material. The ridges 72 also serve as seals for preventing leakage of high pressure fluid around the outside of the plastic seat 58 when the valve element 16 is in closed position.

In the construction illustrated, the plastic seat element 58 comes to a substantial corner where the top face meets the end of the passage through the valve seat construction. This obtains a small area of contact between the valve element 16 and the surface of the plastic seat element 58, and resulting high pressure in proportion to any given force for holding the valve element in closed position. It will be understood that the area of the plastic seat element in contact with the valve element can be changed by varying the shape of the juncture of the end wall of the seat element 50 and the opening through this element.

FIGURES 5 and 6 show a modified construction in which a shell 87 is recessed to receive a plastic seat element 88 similar to the seat element 58 of the construction shown in FIGURES 1–4, except for its different shape. In FIGURES 5 and 6, the shell 87 has a ridge 89, the inner side of which is preferably cylindrical and a continuation of the opening 61 through the center of the shell 87. The outside of the ridge 89 slopes to provide a wedge surface for confining the lower portion of the seat element 88 in the recess in the shell and against a peripheral wall 91 of the shell.

The seat element 88 is inserted into the shell 87, as shown in FIG. 5. The shell fits into the counterbore 20, against the bushing 26 and with the same O-ring 78 as previously described. FIG. 5 shows some of the parts separated in order to illustrate the shape of the seat element 88 at the time of its assembly with the shell 87. A sloping face 93 on the plastic seat element 88 corresponds to the sloping face on the outside surface of the ridge 89; but the seat element is preferably a tight fit in the recessed face of the shell 87 so that there is some radial compression of the plastic when the seat element is pushed down against the sloping face of the ridge 89.

FIGURE 6 shows the seat element 88 slightly higher than the wall 91, the actual difference in height being exaggerated for clearer illustration. When assembled against the ring 59 (FIG. 5), the face of the seat element 88 is pushed down flush with the top face of the wall 91 with some resulting compression of the plastic seat element 88.

The preferred embodiment of the invention has been illustrated and described, but changes and modifications can be made and some features can be used in different combinations without departing from the invention as described in the appended claims.

What is claimed is:

1. In a valve assembly which has a cylindrical valve chamber formed with a smaller diameter section and a counterbore of larger diameter with an annular end face of the counterbore at the location where the diameter of the chamber changes, a valve seat assembly in the counterbore and comprising an annular shell and a plastic seat within the shell and that contacts with an annular end face of the shell, and a tapered valve element having relative movement toward and from the seat to put the valve element selectively in closed and open positions, the improvement which comprises an outside wall of the shell of slightly less axial length than the plastic seat, when the seat is undistorted, a metal ring extending radially inward for a substantial distance beyond the inner limits of the end face of the counterbore but terminating short of the inner radial limit of the seat, the ring being in contact on one side with said end face and having its other side confronting one end of said outside wall of the shell for a portion of the radial extent of the ring and confronting an end face of the plastic seat for another portion of the radial extent of said other side of the ring, the ring clamping the seat against the annular face of the shell, and the seat being stressed in compression and distorted sufficiently to make the ring contact with the confronting end face of the shell, a sealing ring between the shell and the counterbore and a plug that fits into the counterbore and that holds the shell against the ring and the ring against the end face of the counterbore.

2. In a valve assembly which has a cylindrical valve chamber formed with a smaller diameter section and a counterbore of larger diameter with an annular end face of the counterbore at the location where the diameter of the chamber changes, a valve seat assembly in the counterbore and comprising an annular shell and a plastic seat within the shell and that contacts with an annular end face of the shell, and a tapered valve element having relative movement toward and from the seat to put the valve element selectively in closed and open positions, the improvement which comprises an outside wall of the shell, a metal ring extending radially inward for a substantial distance beyond the inner limits of the end face of the counterbore but terminating short of the inner radial limits of the seat, the ring being in contact on one side with the said end face and having its other side confronting one end of said outside wall of the shell for a portion of the radial extent of the ring and confronting an end face of the plastic seat for another portion of the radial extent of the ring, said ring clamping the seat against the annular face of the shell, and a circumferential ridge on said annular face projecting into the seat where the seat contacts with the ridge, said ridge being on a portion of the annular face that confronts said other side of the ring whereby direct axial pressure of the ring holds the seat against the ridge with high localized pressure to prevent leakage of gas around the seat along its areas confronting the shell, a sealing ring between the shell and the counterbore, and a plug that fits into the counterbore and that holds the shell against the ring and the ring against the end face of the counterbore.

3. The valve assembly described in claim 2 and in which there are a plurality of circumferential ridges on the annular face of the shell and said ridges are all portions of the annular face that confronts said other side of the ring, and the seat is distorted locally at the ridges by pressure of the ring to increase the sealing pressure between the seat and the shell.

References Cited in the file of this patent

UNITED STATES PATENTS

| | | |
|---|---|---|
| 627,473 | Boyer | June 27, 1899 |
| 1,374,621 | Wicker | Apr. 12, 1921 |
| 1,669,651 | Block | May 15, 1928 |
| 2,348,548 | Koehler | May 9, 1944 |
| 2,662,348 | Jacobsson | Dec. 15, 1953 |
| 2,696,967 | Wilson | Dec. 14, 1954 |
| 2,703,584 | Mix | Mar. 8, 1955 |
| 2,738,159 | Fleming | Mar. 13, 1956 |
| 2,780,433 | Fleming | Feb. 5, 1957 |
| 2,819,868 | Cauffman | Jan. 14, 1958 |
| 2,924,421 | Pohndorf | Feb. 9, 1960 |
| 2,930,404 | Kowalski | Mar. 29, 1960 |